United States Patent
Ideshio et al.

(10) Patent No.: US 9,156,468 B2
(45) Date of Patent: Oct. 13, 2015

(54) CONTROL DEVICE FOR HYBRID VEHICLE

(75) Inventors: Yukihiko Ideshio, Nissin (JP); Susumu Kojima, Susono (JP); Naoki Nakanishi, Susono (JP); Akihiro Sato, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 35 days.

(21) Appl. No.: 14/342,901

(22) PCT Filed: Sep. 6, 2011

(86) PCT No.: PCT/JP2011/070295
§ 371 (c)(1),
(2), (4) Date: Mar. 5, 2014

(87) PCT Pub. No.: WO2013/035165
PCT Pub. Date: Mar. 14, 2013

(65) Prior Publication Data
US 2014/0277890 A1  Sep. 18, 2014

(51) Int. Cl.
B60W 20/00 (2006.01)
B60K 6/48 (2007.10)
B60K 6/547 (2007.10)
B60W 10/02 (2006.01)
B60W 10/06 (2006.01)
B60W 10/08 (2006.01)
F02D 29/02 (2006.01)

(52) U.S. Cl.
CPC .............. *B60W 20/108* (2013.01); *B60K 6/48* (2013.01); *B60K 6/547* (2013.01); *B60W 10/02* (2013.01); *B60W 10/06* (2013.01); *B60W 10/08* (2013.01); *B60W 20/40* (2013.01); *B60Y 2400/426* (2013.01); *F02D 29/02* (2013.01); *Y02T 10/6221* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| 6,396,165 | B1 | 5/2002 | Nagano et al. | |
|---|---|---|---|---|
| 6,554,088 | B2* | 4/2003 | Severinsky et al. | 180/65.23 |
| 8,296,027 | B2* | 10/2012 | Heap et al. | 701/67 |
| 8,494,730 | B2* | 7/2013 | Yoshikawa | 701/51 |
| 8,506,449 | B2* | 8/2013 | Yoshida et al. | 477/5 |
| 8,565,990 | B2* | 10/2013 | Ortmann et al. | 701/67 |
| 8,868,276 | B2* | 10/2014 | Tanishima et al. | 701/22 |
| 2001/0039230 | A1* | 11/2001 | Severinsky et al. | 477/3 |
| 2004/0055800 | A1* | 3/2004 | Katou et al. | 180/65.2 |
| 2009/0105038 | A1 | 4/2009 | Weiss et al. | |

(Continued)

FOREIGN PATENT DOCUMENTS

| JP | 11-082260 A | 3/1999 |
|---|---|---|
| JP | 2000-161102 A | 6/2000 |

(Continued)

*Primary Examiner* — Y. Beaulieu
*Assistant Examiner* — Krishnan Ramesh
(74) *Attorney, Agent, or Firm* — Kenyon & Kenyon LLP

(57) ABSTRACT

Provided is a control device for a hybrid vehicle capable of attaining an assist torque generated by a clutch mechanism at an appropriate timing, upon starting the engine. Since an electronic control device outputs an engagement command for engaging a clutch (clutch mechanism) at a time preceding an (ignition) start command time for igniting an engine by a preceding-sending time, the clutch becomes engaged when the engine speed starts to increase, and the assist torque generated by the clutch mechanism can thus be obtained at an appropriate timing. Because the engine speed that was once increased upon starting the engine is not decreased, the energy that was consumed for starting the engine can be effectively used.

7 Claims, 6 Drawing Sheets

(56) References Cited

U.S. PATENT DOCUMENTS

| | | | |
|---|---|---|---|
| 2009/0112419 A1* | 4/2009 | Heap et al. ........................ | 701/55 |
| 2011/0118915 A1* | 5/2011 | Ortmann et al. ................... | 701/22 |
| 2011/0245034 A1* | 10/2011 | Yoshida et al. ..................... | 477/8 |
| 2012/0290158 A1* | 11/2012 | Yoshikawa ........................ | 701/22 |
| 2013/0231815 A1* | 9/2013 | Tanishima et al. ............... | 701/22 |

FOREIGN PATENT DOCUMENTS

| | | |
|---|---|---|
| JP | 2001-090757 A | 4/2001 |
| JP | 2004-204963 A | 7/2004 |
| JP | 3821202 B2 | 9/2006 |
| JP | 2006-348862 A | 12/2006 |
| JP | 2007-076646 A | 3/2007 |
| JP | 2008-094123 A | 4/2008 |
| JP | 2009-001165 A | 1/2009 |
| JP | 2009-090781 A | 4/2009 |
| JP | 2009-527411 A | 7/2009 |
| JP | 2010-111195 A | 5/2010 |
| JP | 2011-131825 A | 7/2011 |

* cited by examiner

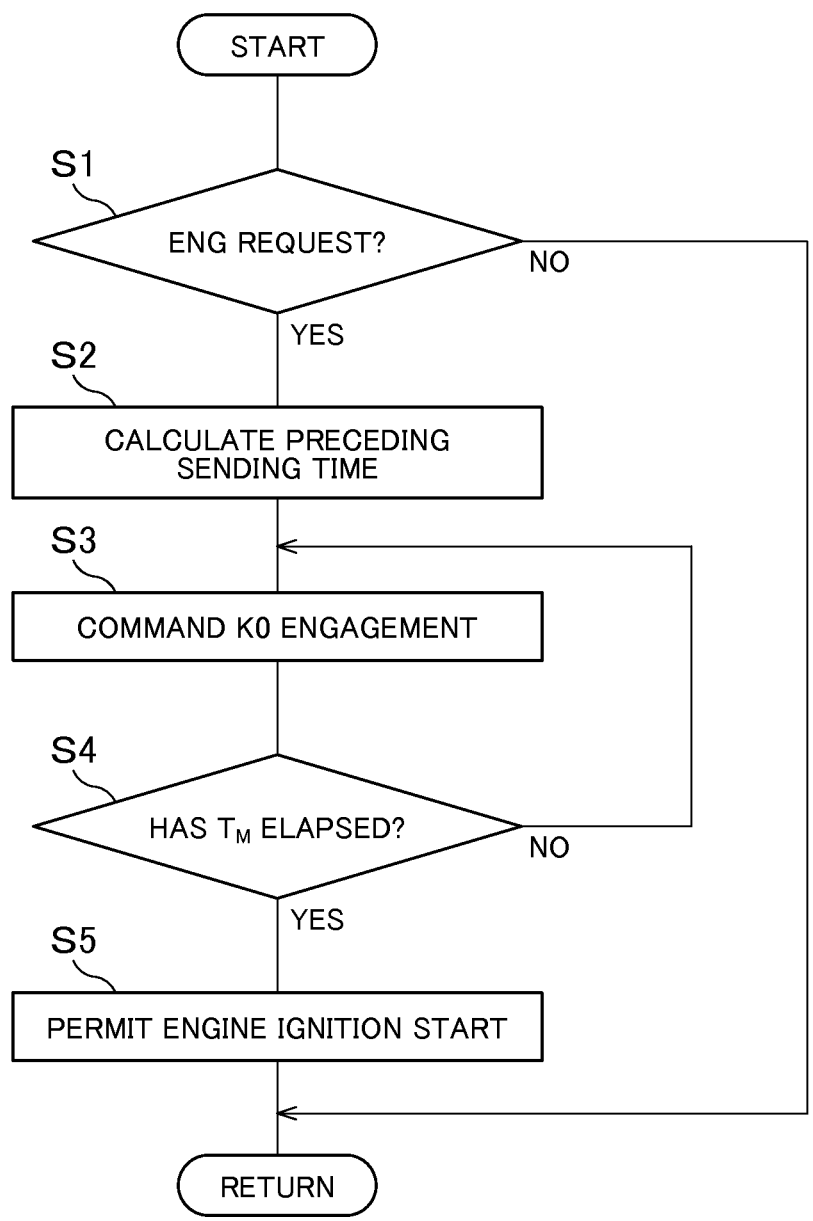

CONTROL DEVICE FOR HYBRID VEHICLE

CROSS REFERENCE TO RELATED APPLICATION

This is a national phase application based on the PCT International Patent Application No. PCT/JP2011/070295 filed on Sep. 6, 2011, the entire contents of which are incorporated herein by reference.

TECHNICAL FIELD

This invention relates to a control device, for a hybrid vehicle provided with a clutch on a power transmission path between an engine and a motor generator (MG), and particularly relates to technology for improving the fuel efficiency by expanding the MG operation range of the hybrid vehicle that is operated with its MG as the driving power source.

BACKGROUND ART

As one type of hybrid vehicles, there is a drive device for a hybrid vehicle provided with a clutch on a power transmission path between an engine and a MG. This hybrid vehicle can selectively use at least one of the engine and the MG as its operational drive source. Generally speaking, a MG operation which disengages the engine by releasing the clutch mechanism and exclusively uses the MG as the drive source is selected during a low vehicle speed and low load operation of the vehicle, and an engine operation which at least uses the engine as the drive source by engaging the clutch mechanism is selected during a high load operation and high vehicle speed of the vehicle. This kind of hybrid vehicle is described, for example, in Patent Document 1.

With this kind of hybrid vehicle, when an engine starting condition is satisfied; for instance, upon transition from the MG operation to the engine operation, when a power generation request for storing electric energy in a power storage device is sent, or when a warm-up request for warming up the engine is sent, the engine is started, the rotation speed of the engine is increased, and the clutch mechanism is engaged after the engine has been started to accelerate the vehicle.

Patent Document 1: Japanese Patent Application Publication No. 2004-204963

SUMMARY OF THE INVENTION

Incidentally, upon using a hydraulic clutch mechanism in which the transmission torque capacity is controlled through application of hydraulic pressure, there is a response lag time from the time that the electromagnetic control valve in the hydraulic control circuit receives an engagement command from the electronic control device to the time that the output hydraulic pressure from the electromagnetic control valve is generated and the engagement torque is generated by the piston pressing the friction plates as a result of the piston moving based on the application of the output hydraulic pressure. Particularly, in cases where it is relatively difficult to increase the engine speed upon starting the engine such as when the engine is started at a low temperature or the engine is started by ignition start of injecting and igniting fuel in a cylinder in an expansion stroke to increase the engine speed from the explosion energy generated in that cylinder, and the response lag of the clutch mechanism increases, since the assist for maintaining the once-increased engine speed and further increasing such engine speed will be delayed before the clutch mechanism is in its engaged state, there were cases where the once-increased engine speed would decrease, thereby disabling the efficient use of the energy that was consumed for starting the engine.

This invention was devised in view of the foregoing circumstances, and an object of this invention is to provide a control device for a hybrid vehicle capable of attaining an assist torque generated by a clutch mechanism at an appropriate timing upon starting the engine.

In order to achieve the foregoing object, the gist of this invention is that a control device for a hybrid vehicle is provided, which includes an engine and a MG used as drive sources, a clutch mechanism that disconnects the engine and the MG from each other, and an engine starter that starts the engine, with the clutch mechanism being in a disengaged state, wherein, upon starting the engine with the engine starter, both of the MG and the engine starter are used to start the engine, with the clutch mechanism being engaged.

According to the foregoing configuration, since the engine starter and the MG are jointly used to start the engine upon starting the engine with the engine starter, the assist torque generated by the MG when the engine is started with the engine starter can be attained at an appropriate timing; that is, at the time that the engine speed starts to increase. Accordingly, since the engine speed that was once increased during the start of the engine will not decrease, the energy that was consumed for starting the engine can be used efficiently.

Here, preferably, with the clutch mechanism being engaged, the engine is started with the MG before rotation speed of the engine, which has been increased by the engine starter, decreases. According to the foregoing configuration, the energy that was used for increasing the engine speed can be efficiently used.

Moreover, preferably, an engagement command for engaging the clutch mechanism is sent before sending a start command for starting the engine upon starting the engine with the engine starter. According to the foregoing configuration, since an engagement command for engaging the clutch mechanism is sent before sending a start command for starting the engine, the clutch mechanism can be engaged at the time that the engine speed starts to increase, and the assist torque by the clutch mechanism can thereby be attained at an appropriate timing. Accordingly, since the engine speed that was once increased during the start of the engine will not decrease, the energy that was consumed for starting the engine can be used efficiently.

Moreover, preferably, a preceding sending time of sending the engagement command for engaging the clutch mechanism, which precedes sending the start command for starting the engine, is a time that is equal to or greater than a difference between a start response time from the sending of the start command for starting the engine to a time when the rotation speed of the engine starts to increase, and a clutch response time from the sending of the engagement command for engaging the clutch mechanism to a rise in a transmission torque of the clutch mechanism. According to the foregoing configuration, the rising section of the engine speed during the start of the engine and the transmission section of the assist torque generated by the clutch mechanism will overlap favorably.

Moreover, preferably, the preceding sending time or the start response time is determined based on at least one among the actual temperature of engine coolant, stop phase position of the engine and presence of reverse flow of exhaust gas when the engine is stopped, according to a pre-stored relation. Moreover, the preceding sending time or the clutch response time is determined based on at least one of the actual clutch ambient temperature and differential rotation speed of the clutch, according to a pre-stored relation. According to the foregoing configuration, there is an advantage in that the preceding sending time can be accurately determined.

Moreover, preferably, the engine is started by so-called ignition start of injecting and igniting fuel in a cylinder in an expansion stroke among a plurality of cylinders provided to the engine, generating torque from an explosion in the cylinder, and repeating this processing to increase the rotation speed of the engine. According to the foregoing configuration, in a hybrid vehicle equipped with the clutch mechanism, electric energy for increasing the rotation speed of the engine is not required, or consumption of electric energy can be reduced in comparison to the case of engaging the clutch mechanism from the start to attain the assist torque generated by the MG.

Moreover, preferably, the clutch mechanism is a so-called fully-dipped wet clutch including friction plates lubricated with a lubricant, and a piston that presses the friction plates based on thrust generated through application of hydraulic pressure. Even when this kind of wet clutch mechanism is used, the clutch mechanism becomes engaged when the engine speed starts to increase, and the assist torque generated by the clutch mechanism can be obtained at an appropriate timing.

BRIEF DESCRIPTION OF THE DRAWINGS

FIG. 10 is a flowchart explaining the relevant parts of the engine start control in the electronic control device of FIG. 1.

MODES FOR CARRYING OUT THE INVENTION

The preferred embodiments of this invention are now explained in detail with reference to the drawings.

Figure 1:
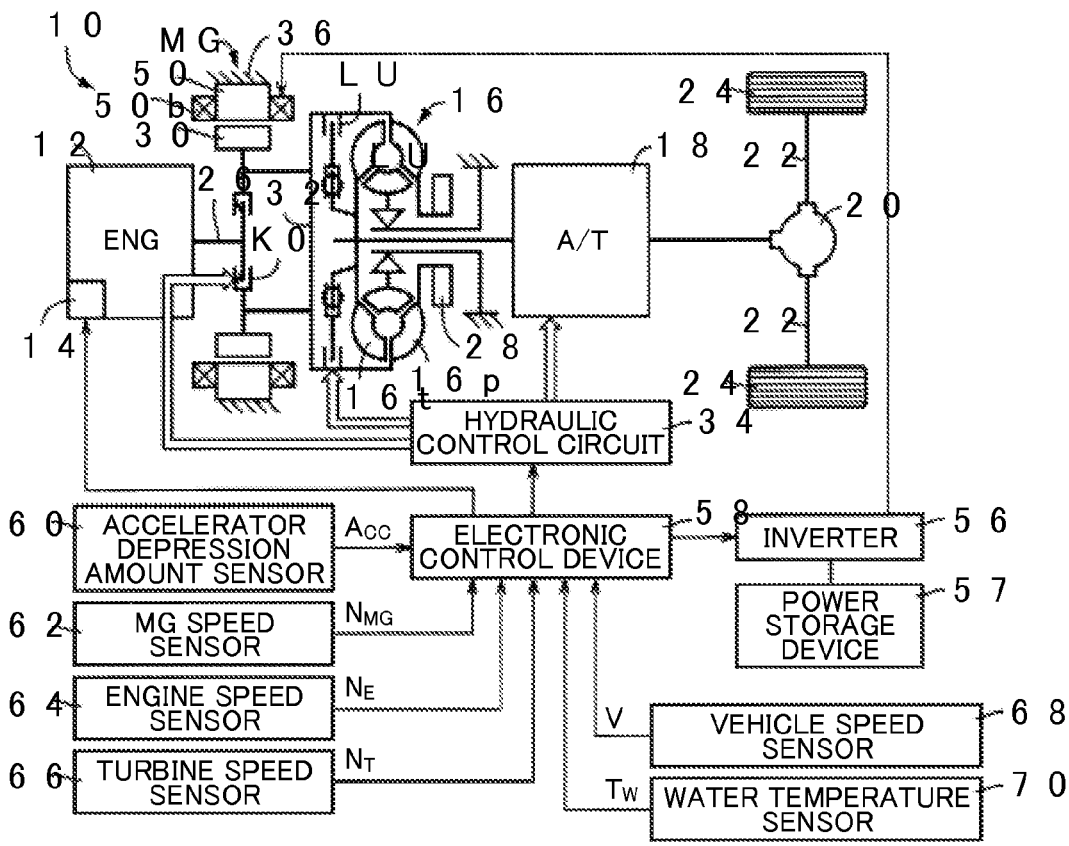
FIG. 1 is a diagram conceptually showing the configuration of a drive system of the drive device for a hybrid vehicle as one embodiment of this invention.

FIG. 1 is a diagram conceptually showing the configuration of a drive system of the drive device 10 for a hybrid vehicle as one embodiment of this invention. The drive device 10 shown in FIG. 1 includes an engine 12 and a MG that function as drive sources, and the driving force that is generated by the engine 12 and the MG is transmitted to a pair of left and right driving wheels 24 via a torque converter 16, an automatic transmission 18, a differential gear unit 20, and a pair of left and right axles 22, respectively. Based on this kind of configuration, the drive device 10 is driven by at least one of the engine 12 and the MG as the operational drive source. In other words, the drive device 10 selectively executes one among an engine operation which exclusively uses the engine 12 as the operational drive source, an EV operation (motor operation) which exclusively uses the MG as the operational drive source, and a hybrid operation which uses the engine 12 and the MG as the operational drive sources.

The engine 12 is, for instance, an internal combustion engine such as an in-cylinder injection gasoline engine or diesel engine in which fuel is directly injected into the combustion chamber. Moreover, in order to control the drive (output torque) of the engine 12, provided is an output control device 14 including a throttle actuator for controlling the opening/closing of an electronic throttle valve, a fuel injection device for controlling the fuel injection, and an ignition device for controlling the ignition timing. The output control device 14 controls the output of the engine 12 by using the throttle controller to control the opening/closing of the electronic throttle valve for performing throttle control, as well as by using the fuel injection device to control the fuel injection for performing fuel injection control, and using the ignition device to control the ignition timing for performing ignition timing control according to commands that are supplied from an electronic control device 58 described later.

The MG is a motor generator that functions as a, motor for generating driving force and as a generator for generating reaction force, and provided on a power transmission path between the engine 12 and the MG is a clutch K0 for controlling the power transmission on the power transmission path according to the engagement status of the clutch K0. In other words, a crank shaft 26 as an output member of the engine 12 is selectively connected to a rotor 30 of the MG via the clutch K0. Moreover, the rotor 30 of the MG is connected to a front cover 32 as an input member of the torque converter 16.

The clutch K0 is configured, for example, from a so-called fully-dipped multiple disk wet clutch mechanism including a plurality of friction plates that are lubricated with a lubricant, and a piston that presses the friction plates or releases the pressure from the friction plates based on thrust that is generated through application of hydraulic pressure. The engagement status of the clutch K0 configured as described above is controlled among engagement (complete engagement), slip engagement and disengagement (complete disengagement) according to the hydraulic pressure supplied from the hydraulic control circuit 34. As a result of the clutch K0 becoming engaged, power transmission is performed (connected) on the power transmission path between the crank shaft 26 and the front cover 32, and as a result of the clutch K0 becoming disengaged, the power transmission is disconnected on the power transmission path between the crank shaft 26 and the front cover 32. Moreover, as a result of the clutch K0 becoming slip-engaged, power transmission is performed on the power transmission path between the crank shaft 26 and the front cover 32 according to the transmission torque of the clutch K0. Note that the clutch K0 is preferably a normally-closed clutch which becomes more engaged as the hydraulic pressure command sent from the electronic control device 58 described later designates a lower hydraulic pressure.

The automatic transmission 18 is, for example, a stepped automatic transmission mechanism in which one among a plurality of predetermined variable speed levels (speed ratios) is selectively established, and is configured by including a plurality of engagement elements for selecting the variable speed level. For instance, the automatic transmission 18 includes a plurality of hydraulic friction engagement devices such as multiple disk clutches or brakes in which engagement is controlled by a hydraulic actuator, and, as a result of the plurality of hydraulic friction engagement devices being selectively engaged or disengaged according to the hydraulic pressure supplied from the hydraulic control circuit 34, one among a plurality of (for instance, from first gear to sixth gear) forward variable speed levels (forward gear position, forward motion gear position), or reverse variable speed levels (reverse gear position, reverse motion gear position) according to the combination of the connected state of the hydraulic friction engagement devices is selectively established.

The output end of the crank shaft 26; that is, one end on the MG side is integrally connected to a clutch hub of the clutch K0 via a drive plate or the like not shown. Moreover, a mechanical hydraulic pump 28 is connected to a pump impeller 16*p* of the torque converter 16, and the hydraulic pressure that is generated by the mechanical hydraulic pump 28 pursuant to the rotation of the pump impeller 16 is supplied, to the hydraulic control circuit 34, as the pressure at the source.

Moreover, a lockup clutch LU which directly connects the pump impeller 16*p* and a turbine wheel 16*t* to enable the integrated rotation thereof is provided between the pump impeller 16*p* and the turbine wheel 16*t* of the torque converter 16. The engagement status of the lockup clutch LU is controlled between engagement (complete engagement), slip engagement, and disengagement (complete disengagement) according to the hydraulic pressure supplied from the hydraulic control circuit 34. In other words, the lockup clutch LU corresponds to a second clutch that is provided on the power transmission path between the MG and the driving wheels 24, and which controls the power transmission on the power transmission path according to the engagement status.

The MG includes a rotor 30 that is rotatably supported by a transmission case 36 to enable rotation around the axis of the torque converter 16, and a stator 50 that is integrally fixed to the transmission case 36 on the outer peripheral side of the rotor 30. The rotor 30 is connected to the front cover 32 via a transmission member that is integrally fixed to the front cover 32 by welding or other methods. Moreover, the stator 50 includes a core in which a plurality of annular steel plates are respectively stacked in the shaft center direction, and integrally fixed to the transmission case 36, and a plurality of coils 50*b* wound around the inner periphery of the core and provided continuously in the peripheral direction.

The MG configured as described above is connected to a power storage device 57 such as a battery or a capacitor via an inverter 56, and the drive of the MG is controlled by adjusting the driving current supplied to the coils 50*b* resulting from the control of the inverter 56 by the electronic control device 58 to be described later. To put it differently, the output torque of the MG can be increased or decreased as a result of the inverter 56 being controlled by the electronic control device 58. Note that, while the output torque from the MG is output only to the torque converter 16 when the clutch K0 is disengaged (not engaged), a part of the output torque is output to the torque converter 16 and the remaining torque is output to the engine 12 when clutch K0 is engaged.

When the drive device 10 makes a transition, for example, from the EV operation of exclusively using the MG as the operational drive source to the engine operation or the hybrid operation of using the engine 12 as the drive source, the engine 12 is started when the clutch K0 becomes engaged. In other words, when the clutch K0 is slip-engaged or completely engaged, the engine 12 is rotatably driven by the torque for starting the engine which is transmitted via the clutch K0, and the engine 12 is started as a result of the engine ignition or fuel supply being controlled while the engine speed $N_E$ is increased. Moreover, here, compensation torque is generated by the MG, and acceleration (deceleration G) in the forward/reverse direction of the vehicle is inhibited. In other words, the engine 12 is started as a result of the engine 12 being rotatably driven by the torque obtained from the explosion energy caused by the ignition, and the torque obtained from the engagement energy of the clutch K0; that is, the engine starting torque that is transmitted via the clutch K0.

In the control system illustrated in FIG. 1, the electronic control device 58 is configured by including a so-called microcomputer equipped with a central processing unit (CPU), a random access memory (RAM), a read-only memory (ROM), and an input/output interface. As a result of the CPU performing signal processing according to the programs that are pre-stored in the ROM while using the temporary storage function of the RAM, various types of control such as the engine start control of this embodiment described later are executed in addition to the basic control such as the drive control of the engine 12, the drive control of the MG, the speed control of the automatic transmission 18, and engagement force control of the clutch K0, and the engagement control of the lockup clutch LU.

The electronic control device 58 is supplied with various input signals that are detected by the respective sensors provided to the drive device 10. For example, input to the electronic control device 58 are, for instance, a signal indicating the accelerator depression amount $A_{CC}$ (%) to be detected by an accelerator depression amount sensor 60, a signal indicating a rotation speed (MG speed) $N_{MG}$ (rpm) of the MG to be detected by a MG speed sensor 62, a signal indicating the rotation speed (engine speed) $N_E$ (rpm) of the engine 12 or the angle of rotation (phase), or the crank angle CA (°), of the crank shaft 26 to be detected by an engine speed sensor 64, a, signal indicating the rotation speed (turbine speed) $N_T$ (rpm) of the turbine wheel 16*t* of the torque converter 16 to be detected by a turbine speed sensor 66, a signal indicating the vehicle speed V (km/h) to be detected by a vehicle speed sensor 68, and a signal indicating the Coolant temperature $T_W$ (° C.) of the engine 12 to be detected by a water temperature sensor 70. Here, the rotation speed $N_G$ of the MG detected by the MG speed sensor 62 is the input rotation speed of the torque converter 16, and corresponds to the rotation speed of the pump impeller 16*p* in the torque converter 16. Moreover, the rotation speed $N_T$ of the turbine wheel 16*t* detected by the turbine speed sensor 66 is the output rotation speed of the torque converter 16, and corresponds to the input rotation speed of the automatic transmission 18.

Various output signals are output from the electronic control device 58 to the various units provided to the drive device 10. For example, supplied to the respective units from the electronic control device 58 are, for instance, a signal supplied to the output control device 14 of the engine 12 for controlling the drive of the engine 12, a signal supplied to the inverter 56 for controlling the drive of the MG, a signal supplied to a plurality of electromagnetic control valves in the hydraulic control circuit 34 for controlling the speed of the automatic transmission 18, and a signal supplied to the hydraulic control circuit 34 for controlling the engagement of the clutch K0.

The electronic control device 58 selects and executes, according to pre-set vehicle conditions, an operation mode among a MG (EV) operation mode which stops the engine 12 when the vehicle is of a relatively low load and exclusively uses the MG as the operational drive source by using the electric energy from the power storage device 57, an engine operation mode which exclusively uses the engine 12 as the operational drive source when the vehicle is of a relatively high load, an engine/MG operation mode which uses both the engine 12 and the MG as the operational drive sources when considerable driving force is temporarily required such as during abrupt acceleration, and a regenerative operation mode which uses the MG to decelerate or put a brake on the vehicle based on the regeneration (power generation) when the vehicle is decelerated and stores the regenerated electric energy in the power storage device 57.

In the MG (EV) operation mode, the drive of the engine 12 is stopped and the clutch K0 is disengaged (complete disengagement). Consequently, the power transmission path between the engine 12 and the MG is blocked, power is not transmitted from the engine 12 to the lockup clutch 16 side, and conversely torque is not transmitted from the lockup clutch 16 side to the engine 12. Meanwhile, in the engine operation mode or the engine/MG operation mode, the engine 12 is driven and the clutch K0 is completely engaged. Consequently, power is transmitted from the engine 12 to the lockup clutch 16 side and conversely torque is transmitted (engine braking is performed) from the lockup clutch 16 side to the engine 12 via the power transmission path between the engine 12 and the MG.

Figure 2:
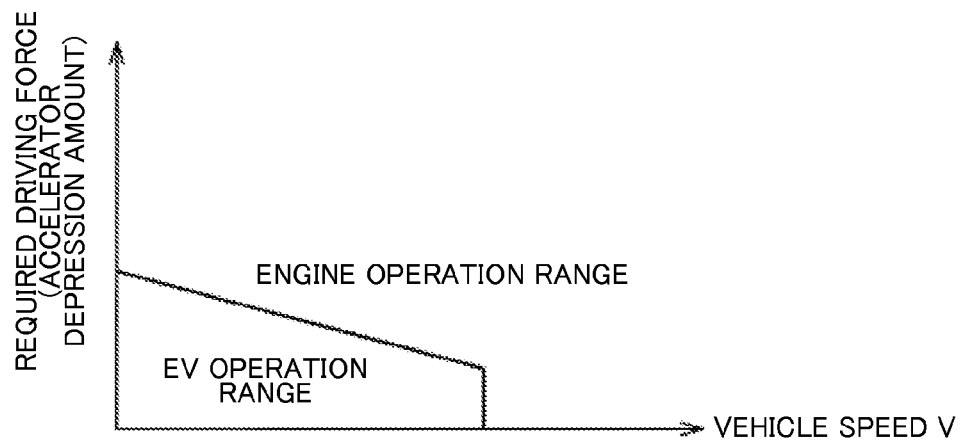
FIG. 2 is a two-dimensional coordinate diagram of the vehicle speed axis and the required driving force (or accelerator depression amount axis) and shows the pre-stored relation of the MG (electric vehicle (EV)) operation range and the engine operation range.

FIG. 2 is a two-dimensional coordinate diagram relating to a vehicle speed axis indicating the vehicle speed V and an axis indicating the required driving force or the accelerator depression amount and shows the relation of the setting of the MG (EV) operation range and the engine operation range, with this relation being pre-stored in the electronic control device 58. The electronic control device 58 determines the MG (EV) operation range or the engine operation range based on the actual vehicle speed V and the required driving force or the accelerator depression amount, and selects the MG (EV) operation mode or the engine operation mode according to the relation shown in FIG. 2. Moreover, when the electronic control device 58 determines the MG (EV) operation range should be switched to the engine operation range, for instance, pursuant to the increase in the required driving force or the accelerator depression amount, the electronic control device 58 outputs an engine start request and causes the engine 12 to be started. The engine start request that is sent while the vehicle is stopped or during the MG (EV) operation is additionally sent pursuant to a warm-up command of the engine 12, detection of decrease in the state of charge SOC of the power storage device, and activation of the air-conditioner, regardless of the operation range.

Figure 3:
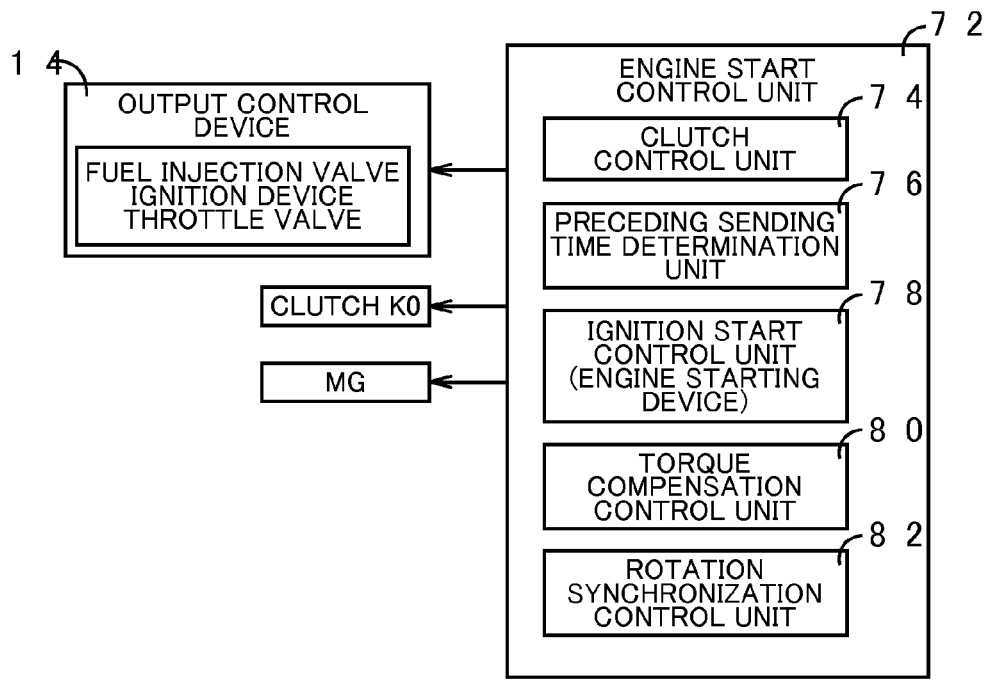
FIG. 3 is a functional block diagram explaining the relevant parts of the control function provided to the electronic control device of FIG. 1.

FIG. 3 is a functional block diagram explaining the relevant parts of the control function provided to the electronic control device 58, and the relevant parts of the control for starting the engine 12 in response to the engine start request. In FIG. 3, the engine start control unit 72 includes a clutch control unit 74, a preceding sending time determination unit 76, an ignition start control unit (engine starter) 78, a torque compensation control unit 80, and a rotation synchronization control unit 82. In response to an engine start request that is sent as a result of a predetermined engine starting condition being satisfied; for instance, when the transition from the MG operation to the engine operation is determined from the relation shown in FIG. 2, when a power generation request for storing electric energy in the power storage device is sent, or when a warm-up request for warming up the engine 12 is sent, the engine start control unit 72 increases the rotation speed of the engine 12 by using ignition start, the clutch K0 is engaged so that the rotation of the engine 12 will increase in a sustainable manner, the rotation of the MG is thereby transmitted to assist (aid) the increase in the engine speed, and the engine 12 is thereby started.

Figure 4:
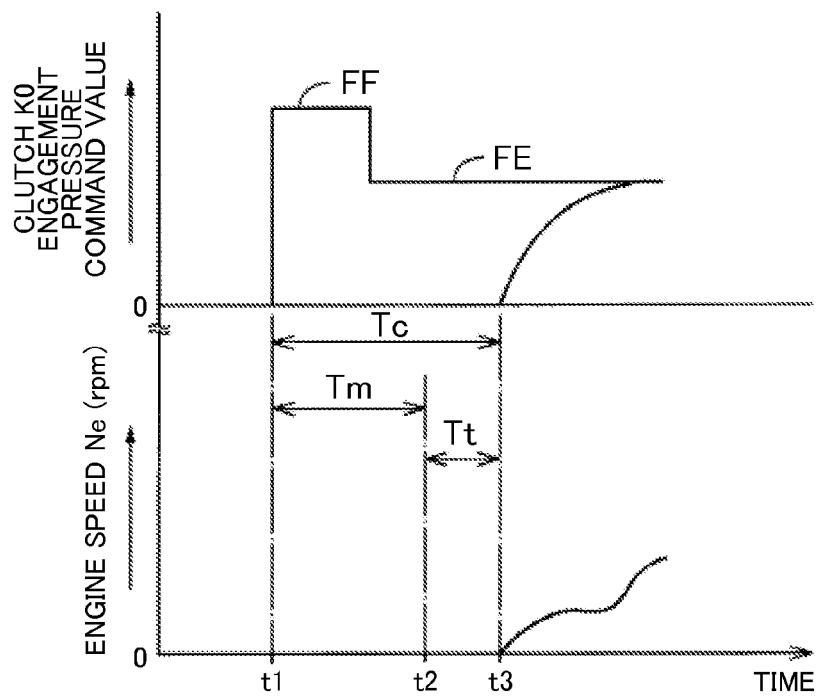
FIG. 4 is a time chart explaining a state where the engagement command pressure for engaging the clutch is sent in advance by a predetermined preceding sending time before the engine start command for starting the engine is sent.

The clutch control unit 74 outputs an engagement command pressure signal of the clutch K0 in response to the engine start request. As shown in FIG. 4, the engagement command pressure signal is configured from a pulsed fast fill part FF in which the output is started from time t1, and a subsequent engagement pressure command part FE which is a flat part that is smaller than the fast fill part FF and corresponds to the engagement pressure of the clutch K0 for realizing the necessary and sufficient engagement torque capacity of the clutch K0. The engagement pressure (torque capacity) of the clutch K0 rises from time t3 after a clutch response time Tc (=t3−t1) from time t1. The clutch response time Tc corresponds to the response lag time from the time that the electromagnetic control valve in the hydraulic control circuit 34 receives an engagement command pressure signal from the electronic control device 58 to the time that the output hydraulic pressure from the electromagnetic control valve is generated and the engagement torque is generated by the piston pressing the friction plates as a result of the piston of the clutch K0 moving based on the application of the output hydraulic pressure.

The preceding sending time determination unit 76 sets the preceding sending time Tm from time t2 of outputting the engine start command to be a time that is equal to or greater than a difference value (Tc−Tt) between an engine start response time Tt from the sending of the start command for starting the engine 12 to the time that the rotation speed of the engine 12 starts to increase and the clutch response time Tc, which were obtained in advance from the relation that is pre-stored in the form of a map or function expression. While the preceding sending time Tm may be a pre-stored fixed value that is set to satisfy the formula of Tm (Tc−Tt), preferably, the preceding sending time Tm is calculated by using the engine start response time Tt and the clutch response time Tc that are corrected according to the vehicle status as shown below, or determined based on the actual operating oil temperature Toil of the clutch K0, the differential rotation ΔNc of the clutch K0, the coolant temperature $T_W$ of the engine 12, and the crank angle CA of the ignition cylinders according to the pre-stored map.

Figure 5:
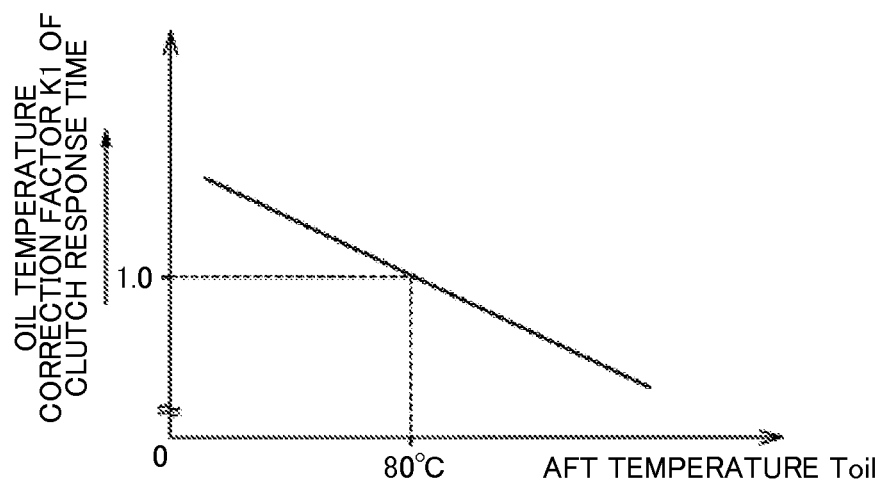
FIG. 5 is a diagram explaining the relation between the operating oil temperature and the clutch response time.
Figure 6:
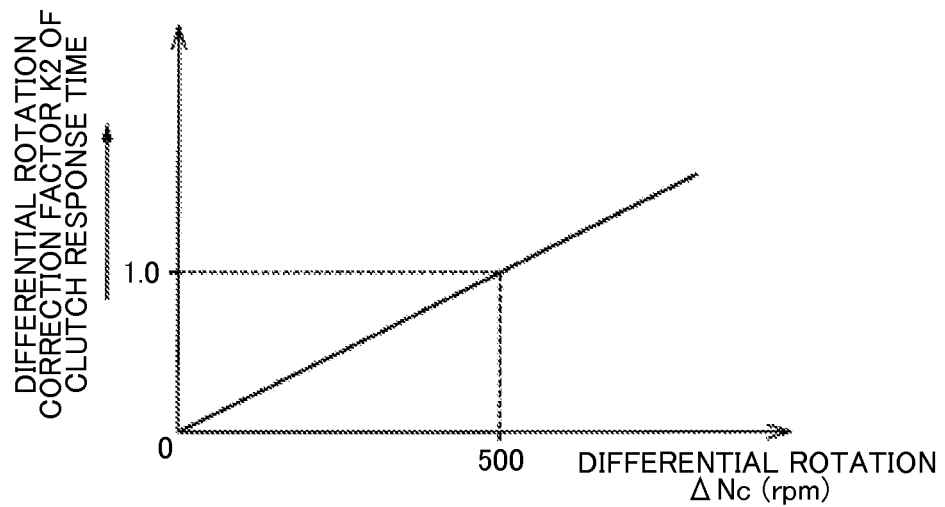
FIG. 6 is a diagram explaining the relation between the differential rotation of the clutch and the clutch response time.

The clutch response time Tc has characteristics of becoming shorter pursuant to the increase in the operating oil temperature Toil of the clutch K0, and characteristics of increasing pursuant to the increase in the differential rotation ΔNc of the clutch K0. Thus, for instance, the preceding sending time determination unit 76 calculates the clutch response time Tc (=Tcb×K1×K2) by determining a correction factor K1 based on the actual operating oil temperature Toil from the pre-stored relation shown in FIG. 5, determining a correction factor K2 based on the actual differential rotation ΔNc of the clutch K0 from the pre-stored relation shown in FIG. 6, and multiplying the base value Tcb, which was experimentally set in advance, by the correction factors K1 and K2. The preceding sending time determination unit 76 may also determine the clutch response time Tc based on the actual operating oil temperature Toil and differential rotation ΔNc from the pre-stored map having the foregoing relation.

Figure 7:
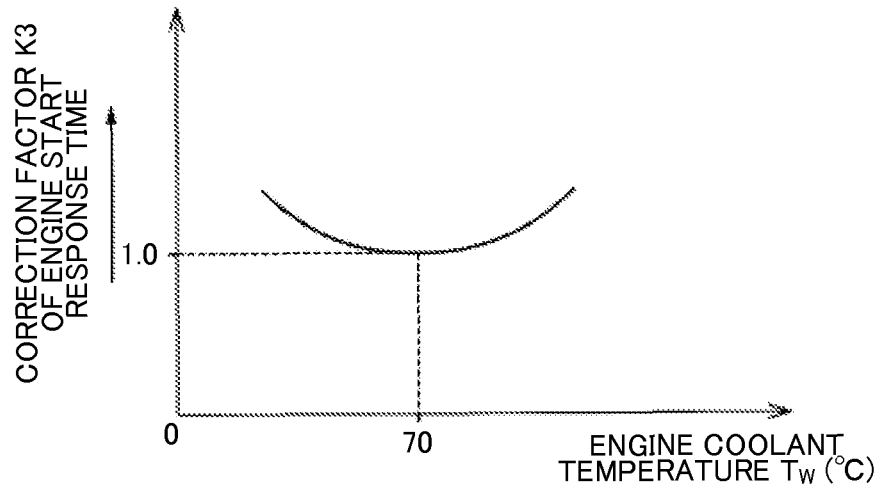
FIG. 7 is a diagram explaining the relation between the engine coolant temperature and the correction factor of the engine starting responsivity.
Figure 8:
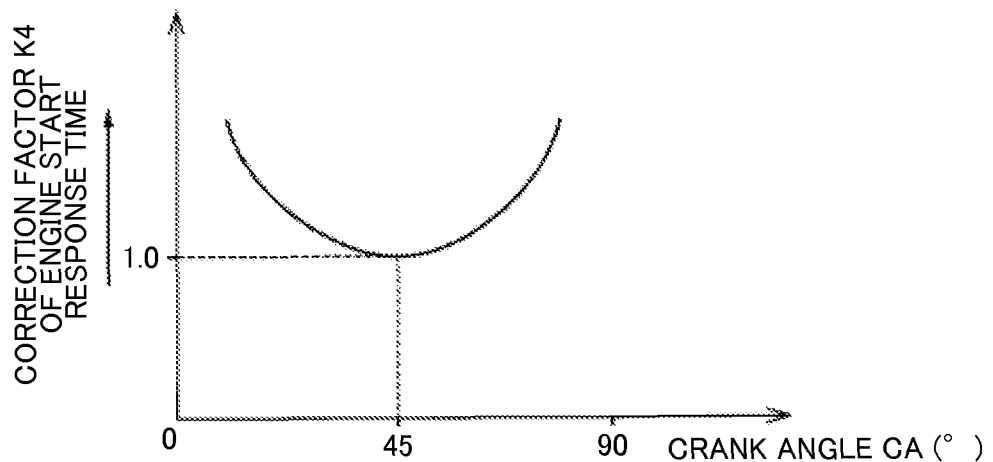
FIG. 8 is a diagram explaining the relation between the crank angle of the engine and the correction factor of the engine starting responsivity.

The engine start response time Tt has characteristics of increasing as the coolant temperature $T_W$ of the engine 12 deviates from the normal temperature $T_{WA}$ of, for example, 70° C. to 80° C., and characteristics of increasing as the crank angle CA (°) of the ignition cylinders during activation deviates from the maximum torque generation angle of roughly 45° in the case of, for example, 8 cylinders. Thus, for instance, the preceding sending time determination unit 76 calculates the engine start response time Tt (=Ttb×K3×K4) by determining a correction factor K3 based on the actual coolant temperature $T_W$ of the engine 12 from the pre-stored relation shown in FIG. 7, determining a correction factor K4 based on the actual crank angle CA of the ignition cylinders during activation from the pre-stored relation shown in FIG. 8, and multiplying the base value Ttb, which was experimentally set in advance, by the correction factors K3 and K4. The preceding sending time determination unit 76 may also determine the engine start response time Tt based on the actual coolant temperature Tw of the engine 12 and the crank angle CA of the ignition cylinders during activation from the pre-stored map having the foregoing relation.

The ignition start control unit 78 functions as an engine starting unit or an engine starter, and increases the rotation speed of the engine 12 and starts the engine 12, without using the assist torque of the MG through use of electric energy, by detecting the cylinder in an expansion stroke among a plurality of cylinders provided to the engine 12, while the rotation of the engine 12 is stopped, based on the crank angle CA or the like, and injecting fuel and igniting that cylinder and causing an explosion to generate torque, and repeating the foregoing processes. The ignition start is performed by the ignition start control unit 78, as shown in FIG. 4, by sending an engine start command and starting the ignition start at time t2 after the lapse of the preceding sending time Tm from time t1, which is the time that the engine start request was sent, and starting the process of increasing the rotation speed of the engine 12 from time t3 after the lapse of the engine start response time Tt. Meanwhile, engagement of the clutch K0 has already been started at time t3. Based on this engagement of the clutch K0, rotation of the MG is transmitted to assist (aid) the increase in the engine speed, and the rotation of the engine 12 is increased in a sustainable manner.

Figure 9:
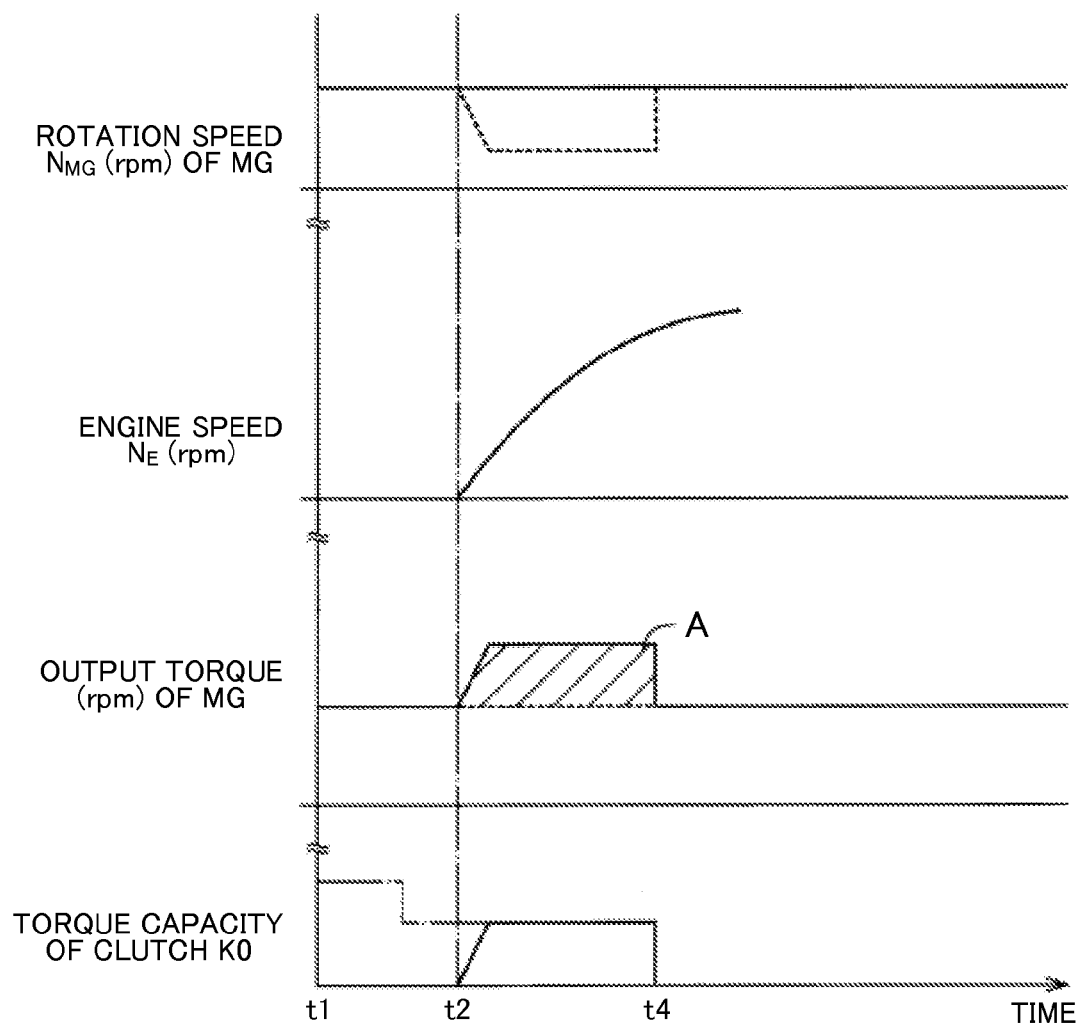
FIG. 9 is a time chart showing the increase in the engine speed, the engagement torque of the clutch, the rotation speed of the MG and the output torque of the MG when the engine is started.

The torque compensation control unit 80 temporarily increases the output torque from the MG, which corresponds to the assist torque that is consumed for increasing the engine speed, as shown in FIG. 9 in order to prevent the occurrence of shock which is caused by a part of the torque output from the MG for operating the vehicle in the MG operation mode being consumed and the operational driving force temporarily decreasing when the rotation of the MG is transmitted due to the engagement of the clutch K0 to assist (aid) the increase in the engine speed during the MG operation. In other words, in FIG. 9, when the clutch K0 is engaged to assist the increase in the rotation speed of the engine 12 during the period from time t3 to time t4, if the output torque from the MG is a fixed value for the MG operation, the rotation speed $N_{MG}$ of the MG will temporarily decrease as shown with the broken line, and the operating vehicle may be subject to shock. However, when torque A, which corresponds to the assist torque that is consumed for increasing the rotation speed of the engine 12, is added to the output torque of the MG as in this embodiment, the portion of the consumed assist torque is compensated and causes the driving torque for operating the vehicle to become constant, and the generation of shock is thereby prevented.

When the rotation speed reaches a pre-set start determination rotation speed of roughly 800 rpm, which is a value that is higher than the rotation speed that enables autonomous rotation, and the starting of the engine 12 is complete, the rotation synchronization control unit 82 adjusts the rotation speed of the engine 12 by using the throttle position or the lag control of the ignition timing of the output control device 14 so as to synchronize the clutch K0, and completely engages the clutch K0 when the foregoing synchronization is complete.

FIG. 10 is a flowchart explaining the relevant parts of the engine start control operation by the electronic control device 58, and is repeatedly executed at a predetermined cycle of roughly several m to several ten m.

In FIG. 10, foremost, in step S1 (the term "step" is hereinafter omitted), for instance, the switching from the MG (EV) operation range to the engine operation range pursuant to the increase in the required driving force or the accelerator depression amount is determined, and whether an engine start request has been sent pursuant to the sending of a warm-up command for warming up the engine 12, detection of the decrease in the state of charge SOC of the power storage device, or activation of the air-conditioner is determined. This routine is ended when the determination of S1 is a negative result.

Nevertheless, when the determination of S1 is a positive result, in S2 corresponding to the preceding sending time determination unit 76, the preceding sending time Tm from time t2, which is the time of outputting the engine start command, is determined to be a time that is equal to or greater than a difference value (Tc−Tt) between an engine start response time Tt from the sending of the start command for starting the engine 12 to the time that the rotation speed of the engine 12 starts to increase and the clutch response time Tc, which were obtained in advance from the relation that is pre-stored in the form of a map or function expression. For example, the preceding sending time Tm is determined based on the actual operating oil temperature Toil of the clutch K0, the differential rotation ΔNc of the clutch K0, the coolant temperature $T_W$ of the engine 12, and the crank angle CA of the ignition cylinders according to the pre-stored map.

Subsequently, in S3 corresponding to the clutch control unit 74, the engagement command pressure signal of the clutch K0 is output from time t1 in response to the engine start request. As shown in FIG. 4, the engagement command pressure signal is configured from a pulsed fast fill part FF in which the output is started from time t1, and a subsequent engagement pressure command part FE which is a flat part that is smaller than the fast fill part FF and corresponds to the engagement pressure of the clutch K0 for realizing the necessary and sufficient engagement torque capacity of the clutch K0. While the engagement torque capacity of the clutch K0 is controlled according to the engagement command pressure signal, since there initially be a delay, the increase begins from time t3 after the clutch response time Tc.

Subsequently, in S4, whether the preceding sending time Tm determined by the preceding sending time determination unit 76 has lapsed from time t1, which is the time that the engagement command pressure signal of the clutch K0 was sent, is determined. As long as the determination result of S4 remains negative, output of the engagement command pressure signal of S3 is repeatedly executed. Nevertheless, when the preceding sending time Tm has lapsed from time t1 and the determination of S4 is a positive result, in S5 corresponding to the ignition start control unit 78, the ignition start is output as shown in time t2 of FIG. 4. Consequently, since the cylinder in an expansion stroke is detected among a plurality of cylinders provided to the engine 12, while the rotation of the engine 12 is stopped, based on the crank angle CA or the like, and fuel is injection into that cylinder and ignited to cause an explosion to generate torque, and the foregoing processes are repeated, the rotation speed of the engine 12 can be increased without using the assist torque of the MG through use of electric energy. Since the engagement output of the clutch K0 has been sent in S3 and the assist torque is applied to the engine 12 as a result of the engagement torque capacity of the clutch K0 being increased in parallel to the increase in the rotation speed of the engine 12, the increase in the engine speed is assisted (aided) by the transmission of the rotation of the MG and, therefore, the rotation of the engine 12 is increased in a sustainable manner, and the engine 12 is thereby started.

Subsequently, a step corresponding to the torque compensation control unit 80 is provided in a step not shown, and, in order to prevent the occurrence of shock caused by the engagement of the clutch K0, as shown in FIG. 9, the output torque from the MG is temporarily increased in the amount of the torque corresponding to the assist torque that is consumed for increasing the engine speed. Moreover, a step corresponding to the rotation synchronization control unit 82 is provided, and, when the rotation speed reaches a pre-set start determination rotation speed of roughly 800 rpm, which is a value that is higher than the rotation speed that enables autonomous rotation, and the starting of the engine 12 is complete, the rotation synchronization control unit 82 adjusts the rotation speed of the engine 12 by using the throttle position or the lag control of the ignition timing of the output control device 14 so as to synchronize the clutch K0, and completely engages the clutch K0 when the foregoing synchronization is complete.

As described above, according to the electronic control device 58 of this embodiment, the clutch K0 (clutch mechanism) is engaged and the MG is jointly used to start the engine 12 upon starting the engine 12 with the ignition start control unit (engine starter) 78. Consequently, since the ignition start control unit (engine starter) 78 and the MG are jointly used to start the engine 12 upon starting the engine with the ignition start control unit 78, the assist torque generated by the MG when the engine is started with the ignition start control unit 78 can be attained at an appropriate timing; that is, at the time that the engine speed $N_E$ starts to increase. Accordingly, since the engine speed $N_E$ that was once increased during the start of the engine will not decrease, the energy that was consumed for starting the engine 12 can be used efficiently.

Moreover, according to the electronic control device 58 of this embodiment, the clutch K0 (clutch mechanism) is engaged and the engine 12 is started with the MG before rotation speed of the engine 12, that was increased by the ignition start control unit 78, decreases. According to the foregoing configuration, the energy that was used for increasing the engine speed $N_E$ can be efficiently used.

Moreover, according to the electronic control device 58 of this embodiment, since an engagement command for engaging the clutch K0 (clutch mechanism) is sent at a time t1 preceding an (ignition) start command (time t2) for starting the engine 12 by a preceding sending time Tm, the clutch K0 becomes engaged when the engine speed $N_E$ starts to increase, and the assist torque generated by the clutch mechanism can thus be obtained at an appropriate timing. Accordingly, since the engine speed $N_E$ that was once increased upon starting the engine 12 is not decreased, the energy that was consumed for starting the engine 12 can be effectively used.

Moreover, according to the electronic control device 58 of this embodiment, since the preceding-sending time Tm of sending the engagement command for engaging the clutch K0 (clutch mechanism), which precedes sending the (ignition) start command (time t2) for starting the engine 12, is a time that is equal to or greater than a difference value between a start response time Tt from the sending of the start command for starting the engine 12 to a time that the rotation speed $N_E$ of the engine 12 starts to increase, and a clutch response time Tc from the sending of the engagement command for engaging the clutch K0 to a rise in a transmission torque capacity of the clutch K0, the rising section of the rotation speed $N_E$ of the engine 12 during the start of the engine 12 and the transmission section of the assist torque generated by the clutch mechanism will overlap favorably, whereby the assist can be attached reliably.

Moreover, according to the electronic control device 58 of this embodiment, the preceding sending time Tm or the start response time Tt is determined based on at least one among actual coolant temperature $T_W$ of the engine 12, crank angle (stop phase position) CA of the crank shaft 26 of the engine 12, and the presence of reverse flow of exhaust gas when the engine 12 is stopped, according to a pre-stored relation. Moreover, the preceding sending time Tm or the clutch response time Tc is determined based on at least one of actual temperature around the clutch and differential rotation speed $\Delta Nc$ of the clutch K0, according to a pre-stored relation. According to the foregoing configuration, there is an advantage in that the preceding sending time Tm can be accurately determined.

Moreover, according to the electronic control device 58 of this embodiment, the engine 12 is started by so-called ignition start of injecting and igniting fuel in a cylinder in an expansion stroke among a plurality of cylinders provided to the engine 12, generating torque from an explosion in that cylinder, and repeating these processes to increase the rotation speed of the engine. Hence, in a hybrid vehicle equipped with the clutch K0, electric energy for increasing the rotation speed $N_E$ of the engine 12 is not required, or consumption of electric energy can be reduced in comparison to the case of engaging the clutch mechanism from the start to attain the assist torque generated by the MG.

Moreover, according to this embodiment, the clutch K0 is a so-called fully-dipped wet clutch including friction plates lubricated with a lubricant, and a piston that presses the friction plates based on thrust generated through application of hydraulic pressure. Even when this kind of wet clutch mechanism is used, the clutch K0 becomes engaged when the rotation speed $N_E$ of the engine 12 starts to increase, and the assist torque generated by the clutch K0 can be obtained at an appropriate timing.

While the preferred embodiments of this invention were described in detail above with reference to the drawings, this invention is not limited thereto, and also be implemented in various other aspects.

For example, in the foregoing embodiment, while described was a hydraulic friction engagement device in which the clutch K0 provided on the power transmission path between the engine 12 and the motor generator MG is engaged via hydraulic pressure, for instance, the configuration may also be such that an electromagnetic clutch or a magnetic particle clutch whose engage state is controlled electromagnetically, is provided on the power transmission path between the engine 12 and the motor generator MG. In other words, this invention can be broadly applied to hybrid vehicles including a clutch provided on the power transmission path between the engine and the motor generator and which controls the power transmission on that power transmission path.

Moreover, while the foregoing embodiment explained a case of applying this invention to the hybrid vehicle 10 including a stepped automatic transmission 18 having a plurality of hydraulic friction engagement devices, the automatic transmission 18 does not necessarily have to be provided.

Moreover, this invention can also be applied to a hybrid vehicle including a continuously variable transmission (CVT), such as an belt-type CVT or a toroidal-type CVT as the automatic transmission, in substitute for the automatic transmission 18. Moreover, this invention may also be applied to a hybrid vehicle in which a plurality of MGs function as an electric CVT based on the electrical paths between the plurality of MGs.

Moreover, in the foregoing embodiment, while the engine 12 was started by simultaneously and jointly using the ignition start control unit 78, which functions as the engine starter, and the motor generator MG, the ignition start control unit 78 and the motor generator MG do not have to simultaneously start the engine 12, and the timing may slightly differ. For instance, the motor generator MG may assist the start of the engine 12 during the period after the engine speed $N_E$ is increased by the ignition start control unit 78 and before the engine speed $N_E$ starts to decrease. In other words, it will suffice for the motor generator MG may assist the start of the engine 12 in the rising section of the engine speed $N_E$.

Moreover, in the foregoing embodiment, while the ignition start control unit 78 that functions as the engine starter injects fuel and ignites a cylinder in an expansion stroke among the cylinders of the engine 12 in a stopped state, and increases the engine speed $N_E$ by using the explosion energy obtained thereby, it is also possible to alternatively provide an engine starter that increases the engine speed $N_E$ and starts the engine 12 by using a starter MG.

Otherwise, while not specifically illustrated, this invention may also be implemented by being variously modified to the extent that such modification will not deviate from the gist of this invention.

10: drive device, 12: engine, 58: electronic control device, 72: engine start control unit, 74: clutch control unit, 76: preceding sending time determination unit, 78: ignition start control unit (engine starter), 80: torque compensation control unit, 82: rotation synchronization control unit, K0: clutch (clutch mechanism), MG.

The invention claimed is:

1. A control device for a hybrid vehicle including an engine and a motor generator used as drive sources, a clutch mechanism that disconnects the engine and the motor generator from each other, and an engine starter that starts the engine, with the clutch mechanism being in a disengaged state, wherein upon starting the engine with the engine starter, both of the motor generator and the engine starter are used to start the engine, with the clutch mechanism being engaged, and an engagement command for engaging the clutch mechanism is sent before sending a start command for starting the engine, a preceding sending time of sending the engagement command for engaging the clutch mechanism, which precede sending the start command for starting the engine, is a time that is equal to or greater than a difference between a start response time from the sending of the start command for starting the engine to a time that the rotation speed of the engine starts to increase, and a clutch response time from the sending of the engagement command for engaging the clutch mechanism to a rise in a transmission torque of the clutch mechanism, and the preceding sending time or the start response time is determined based on a stop phase position of the engine according to a pre-stored relation.

2. The control device for a hybrid vehicle according to claim 1, wherein the clutch mechanism is engaged and the engine is started with the motor generator before rotation speed of the engine, which has been increased by the engine starter, decreases.

3. The control device for a hybrid vehicle according to claim 1, wherein the clutch response time is determined based on at least one of the actual temperature around the clutch and differential rotation speed of the clutch, according to a pre-stored relation.

4. The control device for a hybrid vehicle according to claim 1, wherein the engine is started by ignition start of injecting and igniting fuel in a cylinder in an expansion stroke among a plurality of cylinders provided to the engine, generating torque from an explosion in the cylinder, and repeating this processing to increase the rotation speed of the engine.

5. The control device for a hybrid vehicle according to claim 1, wherein the clutch mechanism is a fully-dipped wet clutch including friction plates lubricated with a lubricant, and a piston that presses the friction plates based on thrust generated through application of hydraulic pressure.

6. The control device for a hybrid vehicle according to claim 1, wherein the rotation speed of the clutch mechanism is synchronized with the rotation speed of the engine after the engine is started, and the synchronized clutch mechanism is subsequently engaged.

7. The control device for a hybrid vehicle according to claim 1, wherein, upon starting the engine during transition from a motor generator operation of using the motor generator as the drive source to an engine operation of using the engine as the drive source, the motor generator outputs a torque that is temporarily increased in the amount of torque corresponding to the assist torque that is transmitted to the engine, based on the engagement of the clutch mechanism to assist the increase in the rotation speed of the engine.

* * * * *